United States Patent [19]

Hoiss

[11] Patent Number: 5,932,074
[45] Date of Patent: Aug. 3, 1999

[54] METHOD AND AN APPARATUS FOR THE DESALINATION OF SEAWATER

[76] Inventor: Jakob Hoiss, Ruffinistrasse 8, D-80637 München, Germany

[21] Appl. No.: 08/793,587

[22] PCT Filed: Sep. 4, 1995

[86] PCT No.: PCT/EP95/03476

§ 371 Date: Feb. 28, 1997

§ 102(e) Date: Feb. 28, 1997

[87] PCT Pub. No.: WO96/07460

PCT Pub. Date: Mar. 14, 1996

[30] Foreign Application Priority Data

Sep. 5, 1994 [DE] Germany .............................. 44 31 546

[51] Int. Cl.$^6$ ................................. B01D 3/00; B01D 3/34
[52] U.S. Cl. ................................................. 203/10; 203/49
[58] Field of Search ................................. 203/10, 49, 86

[56] References Cited

U.S. PATENT DOCUMENTS 4,350,570  9/1982  Maisotsenko et al. .................... 203/10

FOREIGN PATENT DOCUMENTS

| 0 142 251 | 5/1985 | European Pat. Off. . |
| 0 337 693 | 8/1977 | France . |
| 26 00 398 C2 | 1/1985 | Germany . |
| 33 27 958 C2 | 5/1985 | Germany . |
| 164525 | 6/1921 | United Kingdom . |
| 1 218 952 | 1/1971 | United Kingdom . |
| WO 95/06504 | 3/1995 | WIPO . |

OTHER PUBLICATIONS

Jansky, J.; u.a.: Stand und Entwicklungstendenzen der Meerwasserentsalzung. In: Chemiker–Zeitung, 102. Jahrgang, 1978, Nr.7/8, S. 256–258.

Al–Radif, Adel et al: Review of Design of Specifications & The World Largest MSF Units 4X (10–12.8 MIGD), Hemisphere Publishing Corporation, New York, vol. 4, 1991 S. 45–84; Fig. 3.2, 3.3.

*Primary Examiner*—Eggerton A. Campbell
*Attorney, Agent, or Firm*—Jones, Tullar & Cooper, P.C.

[57] ABSTRACT

In a method for the desalination of seawater, there is evaporated and condensed the seawater, within a primary system, and a secondary medium, preferentially untreated water, within a compressor-containing, self-contained secondary system spatially separated from the primary system. The seawater is evaporated by heating in the presence of the secondary medium previously heated in the compressor at excess pressure, the latter medium is evaporated in the secondary system through condensation of the seawater vapour and the seawater vapour is led through a cyclone separator. The total seawater flow supplied to the primary system is subdivided into a first component flow and a second component flow of at least approximately equal magnitude, the first component flow, in a first heat transfer unit through which flows the hot water distillate at the output of the primary system, and the second component flow, in a second heat transfer unit through which flows the discharged hot wash-out, being brought to a temperature approaching the boiling temperature in the primary system. A value between greater than 1 and less than 2 is chosen for the ratio of supplied total seawater quantity per unit of time to wash-out quantity per unit of time (concentration factor CF). A method of this kind is suitable for thermal seawater desalination, enabling the production of germ-free water distillate of high quality under simultaneously lesser concentration of the seawater being evaporated and nonetheless saving energy.

19 Claims, 3 Drawing Sheets

METHOD AND AN APPARATUS FOR THE DESALINATION OF SEAWATER

This application is a 371 PCT/EP95/03476, filed Sep. 4, 1995.

BACKGROUND OF THE INVENTION

The present invention relates to a method and an apparatus for the desalination of seawater.

Fresh water and drinking water are a valuable raw material which is in urgent need not only in particularly dry climatic zones, but also in industrialized countries where the demand is increasing more and more. The growing scarcity of existing resources is leading to substantial efforts to find new sources of drinking water and to treat non-potable water, for example seawater, by cleansing. Especially in very dry regions, the processing of water suitable for plant irrigation from seawater is a necessity.

Usual methods of desalinating seawater are reverse osmosis (RO), vapour recompression evaporation (VR) and multiple-effect evaporation (MSF, ME). In reverse osmosis, the seawater is forced through a semipermeable membrane and cleaned in the process. However, the disadvantage of such RO plants is their very high sensitivity to polluted, especially oil-polluted water, so that it is necessary to constantly control the incoming water. In the VR method, which does not work at excess pressure, the seawater is evaporated under reduced pressure and then condensed again by compression. Evaporation at subatmospheric pressure means that drinking water of good quality can only be obtained from seawater, in coastal regions which is possibly highly contaminated bacteriologically and also further organically contaminated, at additional high, especially chemical expenditure. This is so for the following reasons: firstly, at such a low evaporation temperature, practically only the non-volatile components of the water can be separated from it, for example the salt from seawater, which can be extracted by phase transformation alone. In most cases, separation of the volatile components from the water is not possible by this method alone. Secondly, the disadvantage of the vacuum evaporation method becomes even clearer on observing the microbiological side of distillation. From published investigations, it is known that bacteria, germs and the like can only be killed at a certain temperature and after a certain period as a function of that temperature. Depending on the level of contamination, this is an absolutely essential aspect in the processing of seawater into drinking water, because the method does not ensure that non-evaporated water or particles from same will not also be transferred to the distillate. Thirdly, vacuum evaporation methods of this kind require a pump in the distillate pipe, which extracts the distillate produced from the apparatus under vacuum, this being the only manner in which the pressure difference between the interior under vacuum and normal pressure can be overcome. The result is none other than renewed contamination of the distillate by the moving parts of the pump and increased expenditure in terms of apparatus and maintenance. Multiple-effect evaporation, which, as an energy source, requires thermal energy in the form of hot vapour, disadvantageously involves the continuous consumption of treated water which is used to generate the hot vapour required for the evaporation process. In very dry regions, such as deserts, this water is not available, or reduces the distillation capacity of the plant because it must be drawn from same.

Care must be taken in connection with the desalination of seawater that the solubility limit of $CaSO_4$ (calcium sulphate) is not exceeded. Saturation is reached more rapidly, however, as concentration and temperature increases, so that the solubility limit is reached at about 110° C. and the standard seawater anhydrite calcium-sulphate concentration. In seawater with higher salt concentrations, this limit is reduced to lower temperatures (H. E. Hönig, "Seawater and Seawater Distillation", pages 68 and 69, Fichtner Handbook, published by Vulkan, Essen). The more the process of seawater desalination enters an area of high salt-content in the course of evaporation, the greater will be the level of precipitation of the three calcium-sulphate modifications. It is essential to ensure that, in each of the aforementioned processes, precipitation does not occur in such a way as to block membranes or clog evaporators. Corresponding concentrations can be avoided if wash-out rates are high. Usually, to avoid sedimentation, the seawater is dosed with additives which prevent crystallisation of the modifications occurring in calcium sulphate, for example (anhydride, water-containing calcium sulphate and gypsum), or produce "threshold" effects in the presence of hardeners. The disadvantage in operating with high wash-out rates is an additional consumption of energy, both in RO plants as a result of higher pumping capacity and in MSF and VR plants on account of heating the required quantity of seawater which is now greater by the quantity of wash-out water and must be heated to the respective boiling temperature.

While a method and an apparatus for distillation of untreated water have become known from DE 26 00 398 C2, respectively in and by which previously desalinated and demineralised untreated water is treated and processed into a high-purity, germ-free distillate, approximately the same quantity of distillate being produced as untreated water supplied to the apparatus, this method and this apparatus for distillation of untreated water are not suitable in this form for the desalination of seawater. If a corresponding quantity of seawater were fed into this known apparatus, the primary system would become clogged in a very short space of time with, for example, all three calcium-sulphate modifications and other salts originating from the seawater.

SUMMARY OF THE INVENTION

Accordingly, an object of the present invention is to develop a method and an apparatus of the type mentioned at the outset in such way that respectively the method and the apparatus is suitable for thermal desalination of seawater, in order to produce a germ-free water distillate of high quality under simultaneously lesser concentration of the seawater being evaporated and nonetheless saving energy.

To solve this problem, the total seawater vapour supplied to the primary system is subdivided into a first component flow and a second component flow of at least approximately equal magnitude. The first component flow is brought to a temperature approaching the boiling temperature in the primary system. A value is chosen between 1.3 and 1.4 for the ratio of supplied total seawater quantity per unit of time to wash-out quantity per unit of time. The ratio being denoted as a concentration factor CF. The hot water distillate at the output of the primary system flows through the first heat transfer unit, while the discharged hot wash-out flows through the second heat transfer unit.

With the measures in accordance with the present invention, it is possible, because of the choice of the low value for the concentration factor CF, to achieve a lesser concentration of the seawater in the primary system, which means that the method in accordance with the present invention proceeds within a range lying only a little above the saturation line of the particular calcium-sulphate modification (and also other salts commonly found in seawater) referred to as anhydrite (calcium-sulphate free of water of crystallisation in this instance) or as boiler scale when deposited. This means that it is sufficient to add relatively small quantities of an additive, thereby contributing to environmental care, in order essentially to prevent crystallisation of the anhydrite in the primary system, associated with the herein impractical characteristic of depositing in the apparatus. This low concentration in conjunction with the high wash-out rate also prevents a substantial increase in the boiling temperature in the primary system during operation, which in turn advantageously influences the design of the condenser in the secondary system. A CF value of this kind is especially suitable for a plant with low and medium output. Since the utilized dual-circuit system operates under excess pressure, there is no need for pumps to extract the distillate, so the distillate remains at the level of purity in which it leaves the primary system. This condensation process further produces fresh water of excellent quality with, for example, a NaCl content of less than 5 ppm. The method of distillate production using cyclone precipitation produces a practically germ-free distillate. Because the distillate is free of germs and salt in this way, it can be used for the most varied purposes after appropriate conditioning.

A value of between 1.3 and 1.4 has proven to be a suitable CF value. As a result, the condenser for the seawater can be operated at a throughput which is about three times higher than the quantity of distillate. Accordingly, the velocity of flow in the condenser is likewise three times higher than is the case in a distillation plant without wash-out facility (assuming discontinuous or batch operation).

An increase in the velocity of flow in the evaporator results in an improvement in the heat transmission coefficient in the evaporator, low inclination to formation of deposits on the evaporator walls, low inclination to corrosion, because the formation of coatings which substantially influence e.g. stress corrosion cracking in fissures is impeded, lower dosage quantities if an anti-scaling additive is required, and a higher circulation factor in the evaporator without additional circulation pump. The higher circulation factor results in the seawater being retained for a longer time at evaporation temperature, so that the $F_0$ value (measure of the sterilization quality of the process) is increased. Accordingly, destruction of the microorganisms present in seawater is very much more reliably guaranteed than is the case with a shorter retention time.

In contrast, the velocity of flow is only twice as high at a CF of 2. While the choice of a CF value lower than 1.3 (e.g. 1.2) does mean a further increase in the velocity of flow, it results in an increase in pressure loss in the heat transfer unit. But the admissible pressure loss cannot be allowed to be very great if automatic discharge (i.e. by the existing internal excess pressure in the evaporator of about 0.3 bar at 110° C.) of the wash-out water is to be guaranteed. The plant can drain itself on failure, this being very important in view of various obstruction problems which can arise while cooling. Heat transfer units with very low pressure loss at high throughput are very large and therefore too expensive. Likewise, the consequent very low velocity of flow involves a high risk of clogging or the formation of coatings inside. A further disadvantage of too high a throughput is the energy problem. Since all seawater present in the evaporator must be heated to boiling temperature (110° C. in the example), it also becomes necessary to increase the additional energy. This in turn has an influence on economic efficiency.

An optimum level of efficiency in heat transmission is achieved with the presents invention. In contrast with the MSF process, primary energy is saved in approximately the ratio 2.5 to 1 when using the VR process (W. Lorch, Handbook of Water Purification, second edition 1987, page 457, published by Ellis Horward Limited, Chichester). The process herein described can be approximately equated with the VR process in terms of overall energy consumption. About 480 kW/hour is required to produce 10 m$^3$ of distillate per hour. This corresponds to a consumption of 0.048 kW per kg of distillate, corresponding to 41.3 kcal per kg of distillate.

In a first embodiment of the present invention in accordance with the features of claim 4 and those of claim the boiling temperature only slightly above the temperature of the preheated component flows is reached by means of a heater integrated in the dual-circuit system.

In a second embodiment of the present invention there is provided a heating installation external with reference to the dual-circuit system, so as to enable adaptation to the prevailing energy conditions at the installation site.

Since all parts of the plant are exposed to the corrosive seawater, there is achieved a corrosion-resistant, pitting-resistant design of the heat transfer units.

There is achieved a further increase in the velocity of flow in the evaporator and therefore a further improvement in the aforementioned favorable process variables by the passage through a circulatory evaporator located in the primary system.

A metering station is provided for the admixture of an additive in relatively low dosage to prevent growth of anhydrite crystals.

A renewed treatment of the distillate is required in the use of drinking water applications, because the consumption of large quantities of distilled water interferes with the mineral balance of the human body. Accordingly, certain minerals and the like must be added to the drinking water in conformity with WHO Standard. Renewed treatment is unnecessary in principle when using the water distillate for the irrigation of agricultural installations. The low mineral content prevents rapid oversalination of soils as a result of the salt introduced by the irrigation water. The soils therefore remain fertile for a prolonged period without need for a change of soil or an expensive flushing of the soil. However, special admixtures, such as fertilizer, insecticide and the like, can be added to the distillate as desired. This can be carried out in the above-described alternative manner.

In order to achieve easier starting of the apparatus in accordance with a second embodiment of the present invention a second heat transfer unit is provided with an off-shutting bypass.

Further details of the prevent invention can be taken from the following description, in which the present invention is more closely described and explained with reference to the embodiments illustrated.

DESCRIPTION OF THE PREFERRED EMBODIMENTS

Figure 1:
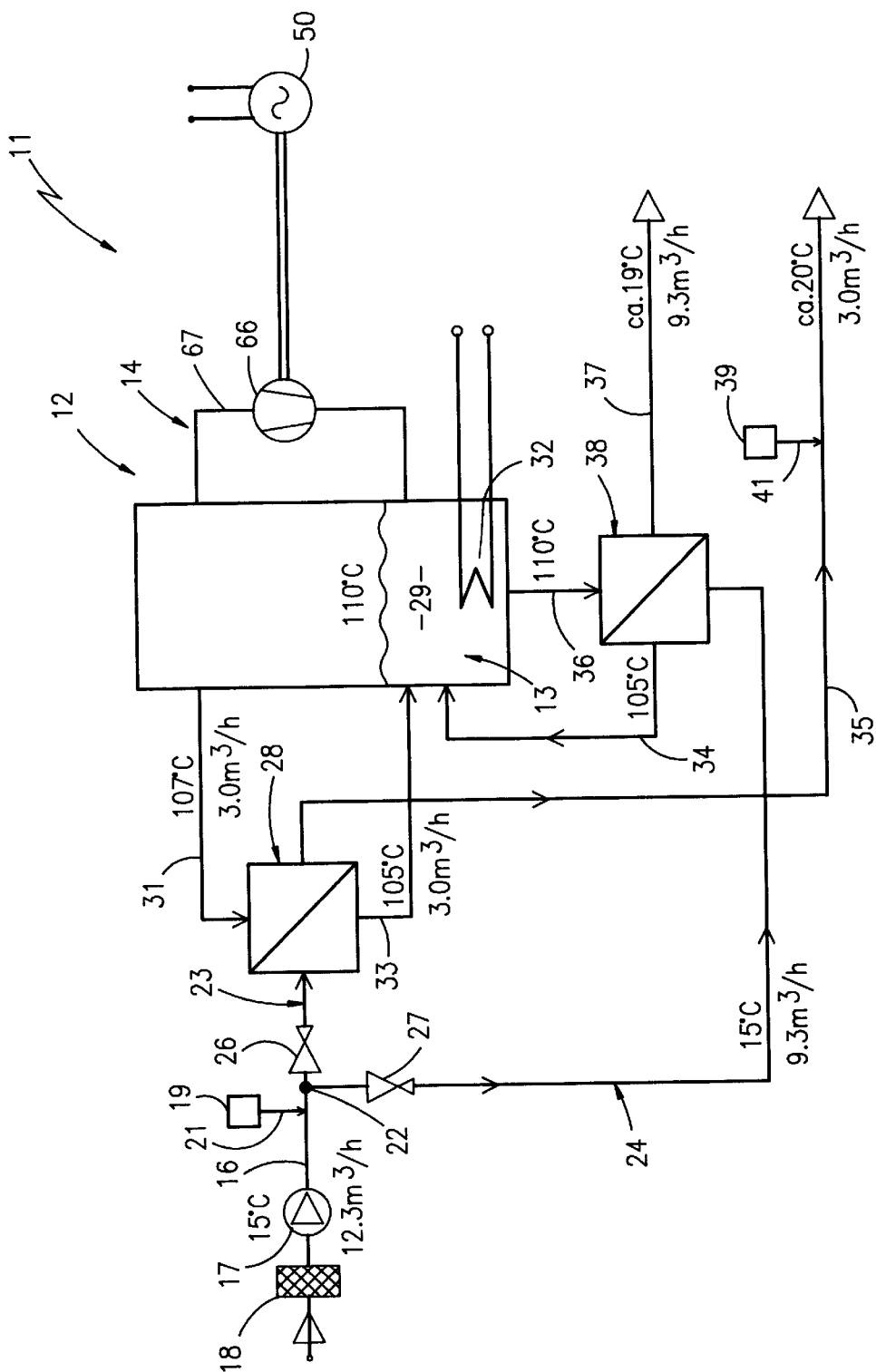
FIG. 1 is a diagrammatic representation, showing an apparatus for thermal excess-pressure desalination of seawater in accordance with a first embodiment of the present invention.

The apparatus 11 or 11' respectively represented in the drawing in accordance with two embodiments of the present invention is used for energy-saving thermal excess-pressure seawater desalination, germ-free water distillate of the highest quality being produced in the process and the apparatus being especially designed for low to medium outputs. The germ-free water distillate is intended especially for use as drinking water or for irrigation. The embodiments represented use a dual-circuit system 12, 12' with a primary system 13, 13' operating under slight excess pressure for the seawater to be desalinated and a spatially separate, self-contained secondary system 14, 14', which is operated under excess pressure by means of a heat pump.

In accordance with the first embodiment of an excess-pressure seawater desalination apparatus 11 represented in FIG. 1, seawater to be desalinated is conveyed over a pipeline 16 immersed in the sea in a manner not represented, by a pump 17 over a filter system 18 upstream of same, in which the cold seawater is freed of coarse particles of for example greater than 200 $\mu$m in size. The pump 17 is designed in such a way that the intaken cold seawater is increased in pressure to the extent just required to overcome all pressure losses in the apparatus 11 and to still provide a desired residual excess pressure at the apparatus output. In the represented embodiment, an excess pressure of about 2 to 3 bar, for example, prevails downstream of the pump, while at the output side, a slight excess pressure of, for example, about 0.25 to 0.30 bar prevails at the distillation column, and about 0.1 bar after the last heat transfer unit 38. Downstream of the pump 17, the pipeline 16 is connected to a metering station 19, over whose connecting pipe 21 an additive is added to the seawater. The additive, which need only be added in relatively small quantities, serves to reduce or modify or entirely avoid the crystallisation of anhydrite ($CaSo_4$) and thus prevent an occlusion of components, in particular the evaporator in the dual-circuit system 12. This additive is chosen as a function of the usage of the water distillate; accordingly, it must also be admissible, for example, for the producing of drinking water and must be environmentally compatible.

The pipeline 16 branches downstream of a distributor 22 into a first feeding pipe 23 and a second feeding pipe 24, in each of which is provided a throttle component 26 and 27 respectively. As a result, the flow of seawater supplied in the pipeline 16 is divided into a first component flow in the first feeding pipe 23 and into a second component flow in the second feeding pipe 24. The volumes of the two component flows are apportioned by the two throttle components 26 and 27 in stationary or regulated manner.

The one side of a first heat transfer unit 28 is connected into the first feeding pipe 23, the other side of the former being located in a distillate pipe 31 which is connected to the output end of the primary system 13. The section 33 of the first feeding pipe 23 emerging from one side of the first heat transfer unit 28 is connected to the input end of the primary system 13, i.e. to a distilling flask 29, into which the first component flow of seawater is introduced.

Accordingly, while the primary system 13 of the dual-circuit heat pump system 12 is fed with the one volume component flow of the seawater to be desalinated, the secondary system 14 is self-contained and has, for example, untreated water in the form of fresh water as secondary medium. In a manner not represented, the secondary system 14 can be connected to an off-shutting pipeline for initial supplying of secondary medium. In the embodiment represented, the distilling flask 29 of the primary system 13 is fitted with a separate heater 32 which, in the embodiment represented, can be operated electrically.

The base of the distilling flask 29 in the primary system 13 is connected to a discharge pipeline 36 into which is fitted the other side of a second heat transfer unit 38. Seawater wash-out is taken from the free output section 37 of the discharge pipeline 36. In other words, the discharge pipeline 36 serves to return non-desalinated or non-evaporated seawater to the sea, for example. The second feeding pipe 24 is connected to the one side of the second heat transfer unit 38, so that the second volume component flow flows through the second heat transfer unit 38 and is likewise introduced over the output section 34 of the second feeding pipe 24 into the distilling flask 29 of the primary system 13.

The distillate pipe 31 is connected at its output section 35 to a conditioning station 39, over whose connecting pipe 41 conditioning agent is added to the germ-free water distillate of highest quality. The kind of conditioning agent depends on the intended use of the water distillate, that is whether it is to be used, for example, as drinking water, or for irrigation. For example, different mineral substances are provided as conditioning agent in the former case and, for example, fertilizer or the like in the latter case.

The heat transfer units 28 and 38 represented in diagrammatic form in FIG. 1 are heat transfer units [heat exchangers] manufactured from titanium in dismountable plate-type exchanger technology, which are highly efficient on account of low wall-thickness and pressure losses, demonstrated high resistance to corrosion, and which can be manufactured in a very economical manner.

Figure 3:
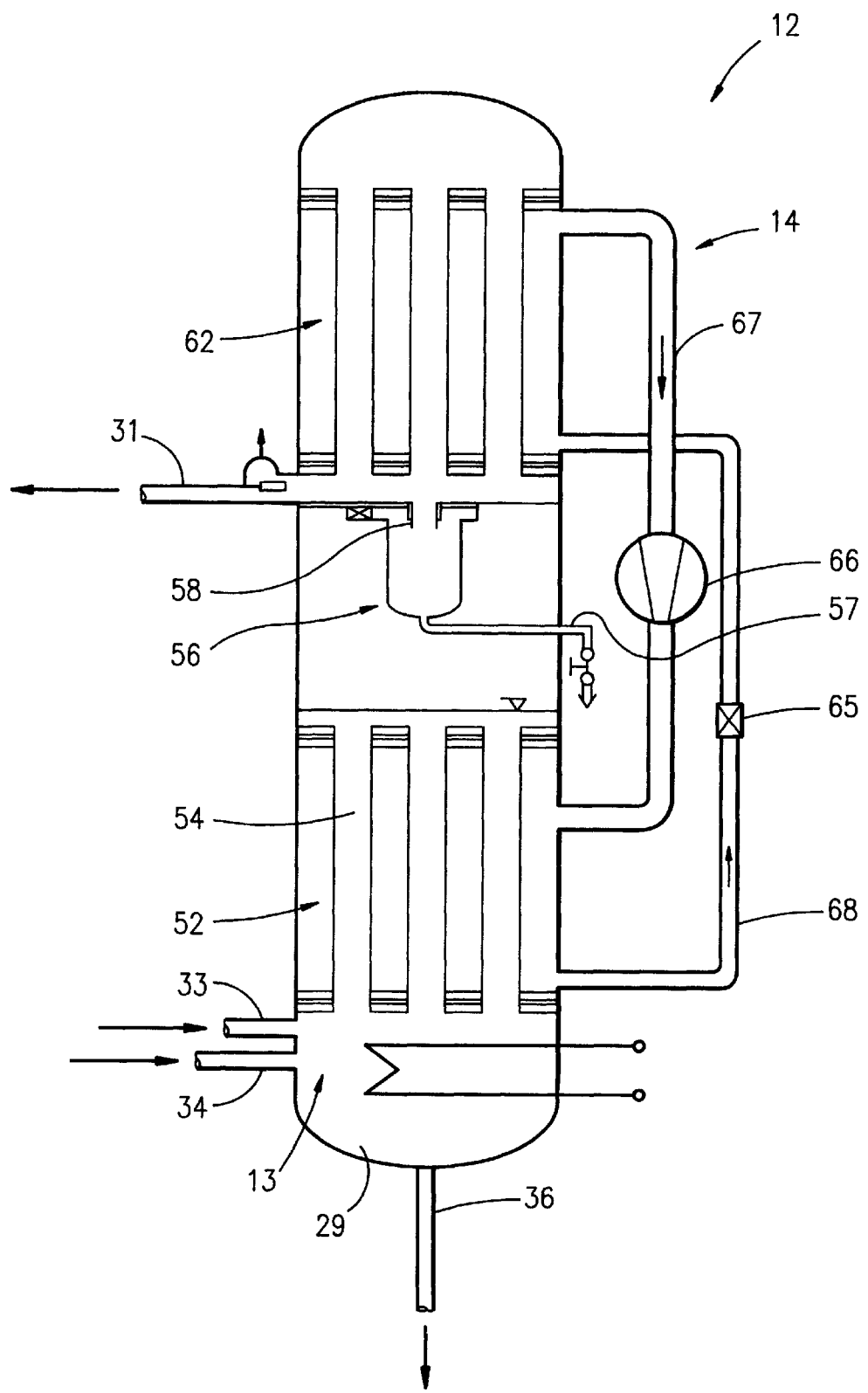
FIG. 3 is an enlarged diagrammatic representation, showing that part of the apparatus which contains the dual-circuit process system.

Prior to examining the method of thermal excess-pressure seawater desalination with reference to the apparatus 11 represented in FIG. 1, it is first intended to describe the mode of operation of the dual-circuit heat-pump system 12 with reference to FIG. 3. The seawater entering the secondary system 13 through the two feeding pipes 23/33 and 24/34, is preferentially preheated to just under the distilling temperature in reverse direction of flow to the distillate emerging from the distillate pipe 31, or respectively the wash-out emerging from the discharge pipeline 36 in respectively the first and second heat transfer units 28, 38, reaches, as mentioned, the distilling flask 29, which is arranged under a first heat exchanger 52, which operates as an evaporator in the primary system 13. From the distilling flask 29, the seawater to be treated rises into the evaporator area 54 of the first heat exchanger 52 also advantageously manufactured from titanium, which is designed, for example, in the form of a corrugated surface evaporator. The distillate vapour produced in the so-called tubes of the evaporator area 54 of the first heat exchanger 52 rises upward and passes through a cyclone separator 56, in which entrained droplets and particles are separated by very high centrifugal acceleration of the vapour. Due to a physical effect, there is formed, between the inner wall of the cyclone separator and the distillate vapour, a film of water of small volume only, which migrates, on account of the internal flow field, into the bottom part of the cyclone separator 56 and therefore does not pass into the distillate. The collecting water is drained off over a pipe 57 at the bottom (approx. 0.2% of the plant distillate capacity). The distillate vapour itself does not come in contact with the metal surface at the critical points of maximum velocity, but passes over the immersion tube 58 arranged at the centre of the cyclone separator 56 into a second heat exchanger 62, which operates as a condenser in the primary system 13. In this second heat exchanger 62, which is likewise designed, for example, in the form of a corrugated surface evaporator/condenser, the vapour emerging from the cyclone separator 56 flows, for example after a change in direction through 90°, through the so-called splitting chambers between the upright corrugated-surface plates and condenses in the process. The condensate in the form of seawater distillate leaves the primary system 13 over the distillate pipe 31, still at a slight excess pressure.

The condensation heat of the primary medium (seawater to be desalinated or seawater vapour) released in the primary system 13 in the second heat exchanger 62 operating as a condenser is used in the secondary system to evaporate the secondary medium, which is fed only once into the secondary system 14. The secondary-medium vapour produced in the secondary system is led over a non-represented conventional mist collector from the top part of the dual-circuit system 12 into a compressor 66, which is driven by an electric motor 50. Compression and an associated temperature rise takes place in the compressor 66. The secondary-medium vapour leaving the compressor 66 is hot enough to be used, in the first heat exchanger 52, which operates as an evaporator in the secondary system 14, essentially as the sole heating medium for evaporation of the preheated, filtered seawater. The condensation of the secondary-medium vapour in the first heat exchanger 52 causes the seawater to be evaporated in the latter. The secondary-medium condensate arising leaves the first heat exchanger 52 and passes over a pipe 68 and over a throttle valve 65 into the upper, second heat exchanger 62, which operates as an evaporator in the secondary system 11. The secondary-medium condensate flows into a bottom area of the second heat exchanger 62 and flows vertically upward as vapour through the heat-exchanger tube chambers and from there over the pipe 67 back to the compressor 66. It is understood that the two systems 13 and 14 are entirely separated from one another and that the two heat exchangers 52 and 62 are designed in a corresponding manner.

In accordance with the embodiment represented in FIG. 1, the seawater is fed into the apparatus 11 at about 15° C., a total volume flow of, for example, 12.3 m$^3$/hour being achieved with the aid of the pump 17. The two throttle components 26 and 27 are adjusted in such a way that the first volume flow in the first feeding pipe 23 amounts to approximately 3.0 m$^3$/hour and the second volume flow in the second feeding pipe 24 to approximately 9.3 m$^3$/hour. The magnitude of the first volume flow in the first feeding pipe 23 is determined by the distillate volume flow in the distillate pipe 31, namely in such a way in the embodiment that both volume flows are about equal. The distillate emerging from the primary system 13 of the dual-circuit system 12 at a temperature of about 107° C. and flowing through the first heat transfer unit 28 results in the first volume flow in the first feeding pipe 23 reaching a temperature of about 105° C. after flowing through the first heat transfer unit 28 and then entering the distilling flask 29 of the primary system 13 at this temperature. The distillate cools off to about 20° C. and emerges at about 0.1 bar. The second volume flow in the second feeding pipe 24 is heated in the second heat transfer unit 38 to a temperature of likewise in the region of 105° C., since the wash-out flowing from the distilling flask 29 flows at about 110° C. through this second heat transfer unit 38. The wash-out is cooled off to about 19° C. at the end of the second heat transfer unit 38 and emerges at about 0.1 bar. The wash-out volume flow emerging from the distilling flask 29 of the primary system 13 is of the same magnitude as the second volume flow in the second feeding pipe 24, amounting, accordingly, to about 9.3 m$^3$/hour. After the heating to about 105° C., at which the two volume flows enter the distilling flask 29, the seawater thus heated is brought to a boiling temperature with the aid of the separate heater 32, this being about 110° C. in the primary system 13 under excess pressure. As mentioned, the temperature difference remaining for evaporation is introduced by the heat-pump circuit of the secondary system 14. In accordance with the present invention, the process for thermal excess-pressure seawater desalination is operated at a low concentration and therefore a high wash-out rate. In the method in accordance with the present invention, a concentration factor CF, which represents the ratio of total supplied quantity of seawater to wash-out quantity, is adjusted in the region between greater than 1 and less than 2, preferentially between 1.3 and 1.4. In the embodiment represented, CF=12.3 M$^3$/hour/9.3 m$^3$/hour≈1.33. When such a CF is chosen, the risk of corrosion within the primary system 13 or within the apparatus 11 is relatively slight, since the salt content in the distilling flask 29 rises to at most 45 g/kg given a seawater salt content of about 34 g/kg. Accordingly, the method works within a range just above the saturation line for anhydrite, so that additives need only be added in very small quantities over the metering station 19. This low CF value results in a high level of seawater circulation because of the resultant high wash-out rate. This improves the heat transfers in the distilling system 13 and likewise prevents the formation of deposits in the system.

The apparatus 11 in accordance with FIG. 1 is started by filling the distilling flask 29 of the primary system 13 to the usual level with seawater to be desalinated and heating it to about 110° C. with the aid of the separate heater 32. The compressor of the secondary system 14 is then switched on, so that the thermal process for excess-pressure seawater desalination can begin.

Figure 2:
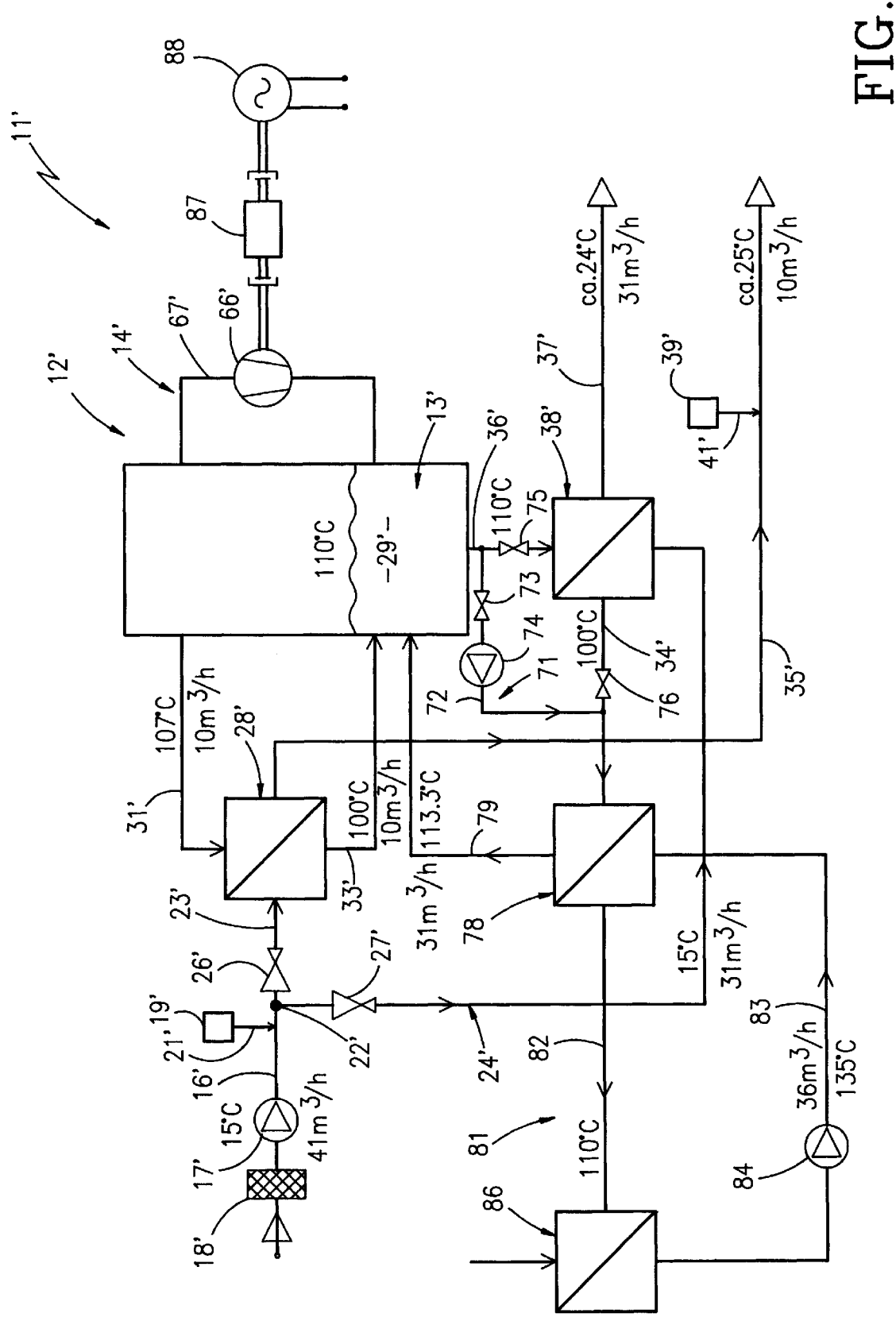
FIG. 2 is a representation corresponding to FIG. 1 of an apparatus for thermal excess-pressure desalination of seawater in accordance with a second embodiment of the present invention.

The apparatus 11' represented in FIG. 2 in accordance with a second embodiment for excess-pressure seawater desalination to produce germ-free water distillate of the highest quality in an energy-saving manner, essentially corresponds in plant and method technology to the apparatus in accordance with FIG. 1. Those components which are correspondingly used both in apparatus 11 and in apparatus 11' are therefore each provided with the same reference number and a prime mark. The differences between the two apparati 11' and 11 consist especially in that the design of the separate heater accompanying and starting the process is developed in a different manner. A further difference consists in the higher production of distillate per unit of time and therefore in the stipulated higher volume flows. The apparatus 11' in accordance with FIG. 2 likewise operates at a concentration factor CF in the region of between greater than 1 and less than 2, preferentially between 1.3 and 1.4 and in this case likewise at a CF≈1.33.

A filtered (filter 18') seawater volume flow of 41 m$^3$/hour is conveyed through the pipeline 16' with the aid of the pump 17'. After the addition of additives (metering station 19'), there is produced, with the aid of the throttle components 26' and 27', a first volume flow of 10 m$^3$/hour in the first feeding pipe 23' and a second volume flow of 31 m$^3$/hour in the second feeding pipe 24'. The first volume flow is heated in the first heat transfer unit 28' by the approximately 107° C. hot distillate flow of 10 m$^3$/hour to about 100° C. and conducted into the distilling flask 29' of the primary system 13'. The second volume flow is likewise brought to about 100° C. in the second heat transfer unit 38' by the approximately 110° C. hot wash-out flow of 31 m³/hour from the distilling flask 29'. This second volume flow through section 34' of the second feeding pipe 24' is now conveyed not directly but indirectly over to the one side of a third heat transfer unit 78 and a pipeline 79 to the distilling flask 29' of the primary system 13'. At the output from the third heat transfer unit 78, the second volume flow of 31 m³/hour has a temperature of about 113.3° C. Mixing of the two volume flows produces a mix temperature of the seawater to be evaporated of about 110° C. in the distilling flask 29', which corresponds to the boiling temperature in the primary system 13'. Evaporation proceeds in this case also with the aid of the heat-pump circuit of the secondary system 14'.

The third heat transfer unit 78 is part of a heating installation 81, which carries, in its circulating pipeline 82, 83, a heat transfer medium, for example oil, which is circulated by a pump 84. This heat transfer medium flows both through the other side of the third heat transfer unit 78 and through the one side of an oil-heated or gas-heated boiler 86. In the boiler 86, the heat transfer medium, whose volume flow amounts to, for example, 36 m³/hour, is heated to 135° C. and is cooled off to about 111° C. after passing through the third heat transfer unit 78.

The compressor 66' of the secondary system 14' is driven not with the aid of an electric motor as in the embodiment in accordance with FIG. 1, but with the aid of a diesel set 87, which also drives a generator 88 which supplies electrical energy to control the apparatus 11' and drive the pumps, valves and the like.

For starting of the apparatus 11' in accordance with FIG. 2, a bypass 71 is provided for the second heat transfer unit 38'. For this purpose, a bypass pipe 72 which is fitted with a shut-off valve 73 and a pump 74 runs between the discharge pipeline 36' and the section 34' of the second feeding pipe 24'. Furthermore, a valve 75 is fitted in the discharge pipeline 36' in the downstream direction after the bypass pipe 72 and a shut-off valve 76 in feeding-pipe section 34' in the upstream direction before the bypass pipe 72. To start the process, the distilling flask 29' is first filled with seawater above the usual level, so as to have sufficient water for the heat-up phase. With valves 75 and 76 closed and valve 73 open in the bypass pipe 72 and with pump 74 switched on, seawater is pumped in circulation over the third heat transfer unit 78 into the distilling flask 29'. With heating installation 81 switched on, operation continues at these valve settings until there is an intake excess-pressure of about 0.1 to 0.2 bar in the distilling flask 29', corresponding to a boiling temperature of about 110° C. The compressor 66' in the secondary system 14' is then switched on and simultaneously, valves 75 and 76 are opened, valve 73 is closed and the pump 74 is switched off.

It still remains to be mentioned that in this embodiment, the distillate emerges from the distillate pipe 31 at a temperature of about 25° C., at a pressure of about 0.1 bar and a volume flow of 10 m³/hour. The wash-out flow of 31 m³/hour still has a temperature of about 24° C. and emerges at an excess pressure of about 0.1 bar from section 37' of the discharge pipeline 36'.

By operating the apparatus 11 or 11' at a CF of between 1.3 and 1.4, for example CF=1.33 in the embodiment, a seawater throughput can be achieved in the evaporator 52 of the primary system 13, 13' which is about three times higher than the quantity of distillate. Accordingly, the velocity of flow in the evaporator is likewise three times higher than is the case in a distillation plant without wash-out facility (assuming discontinuous or batch operation). An increase of this kind in the velocity of flow in the evaporator results in the following characteristics favorable to the process:
a) improvement in the heat transmission coefficient in the evaporator,
b) low inclination to formation of deposits on the evaporator walls,
c) low inclination to corrosion, because the formation of coatings which substantially influence e.g. stress corrosion cracking in fissures is impeded,
d) lower dosage quantities if anti-scaling additive is required,
e) a higher circulation factor in the evaporator without additional circulation pump and
f) little[1] disadvantageous increase in pressure loss in the heat transfer unit.

The higher circulation factor results in the seawater being retained for a longer time at evaporation temperature. This has the advantage that the $F_0$ value (measure of the sterilization quality of the process) is increased. Accordingly, destruction of the microorganisms present in seawater is very much more reliably guaranteed than is the case with a shorter retention time.

In accordance with variants not represented, the evaporator 52 of the primary system 13, 13' is advantageously designed as a liquid evaporator, as a means of further increasing the velocity of flow in the evaporator 52 and thus augmenting the described favorable process variables. In accordance with one variant, a natural or automatic circulation of liquid is produced in that the vapour bubbles formed in the evaporator tubes drive the boiling solution upward in accordance with the mammoth pump principle and a chamber system outside the evaporator tubes facilitates return of the solution. This can be an evaporator of the Robert type, for example. In accordance with the other variant, an evaporator with forced circulation and an external heating element is used instead of an evaporator with automatic circulation. The velocity of flow can be directly predetermined by altering the output of a recirculating pump.

It is understood that volume flows of other magnitudes are possible and that the type and means of separate heating depends on the one hand on the capacity of the apparatus 11 or 11' respectively and on the other hand, on the location of the installation. The dependence on the location of the installation especially involves the question of availability of electrical energy or exclusively oil or gas. The essential is that the concentration factor CF be chosen at a lesser value than 2, so that the apparatus 11 or 11' respectively can work within a range of lower concentration, which in all cases prevents the formation of gypsum and restricts the crystallisation of anhydrite to a minimum, so that additives for complete prevention of anhydrite crystallisation need only be added in relatively small quantities.

I claim:
1. A method for the desalination of seawater, using a primary system having a first and second heat transfer means, and a closed secondary system including a compressor which is separated from the primary system, where the seawater is evaporated and condensed within the primary system and a secondary medium, preferentially untreated water, within the compressor-containing, self-contained secondary system, comprising the steps of:
evaporating the seawater by heating in the presence of the secondary medium previously heated in the compressor at excess pressure and evaporated in the secondary system through condensation of the seawater vapour;

passing the seawater vapour through a cyclone separator and through subsequent condensation of the seawater vapour;

evaporating the secondary medium which has relaxed again in the secondary system;

subdividing the total seawater vapour supplied to the primary system into a first component flow and a second component flow of at least approximately equal magnitude;

bringing the first component flow to a temperature approaching the boiling temperature in the primary system, in the first heat transfer means through which hot water distillate flows at the exit of the primary system;

bringing the second component flow to a temperature approaching the boiling temperature in the primary system, in the second heat transfer means through which the discharged hot wash-out flows; and choosing a value between 1.3 and 1.4 for the ratio of supplied total seawater quantity per unit of time to wash-out quantity per unit of time, said ratio being denoted as the concentration factor CF.

2. A method as claimed in claim 1, wherein the concentration factor (CF) is chosen being about 1.33.

3. A method as claimed in claim 1, wherein the magnitude of the first component flow is chosen approximately equal to the magnitude of the distillate flow and the magnitude of the second component flow approximately equal to the magnitude of the wash-out flow.

4. A method as claimed in claim 1, wherein the preheated first and second component flows are brought to a boiling temperature in a distilling flask of the primary system.

5. A method as claimed in claim 1, wherein the second component flow is heated a further time, namely to a temperature above the boiling temperature in the primary system, in such a way that the mixture of the first and second component flow possesses the boiling temperature prevailing in the primary system.

6. A method as claimed in claim 1, wherein the seawater is led through a circulatory evaporator located in the primary system.

7. A method as claimed in claim 1, wherein an additive to prevent growth of anhydrite crystals is added in relatively small quantities to the total seawater flow.

8. A method as claimed in claim 1, wherein the germ-free water distillate is conditioned.

9. An apparatus for the desalination of seawater, including:

a primary system for the seawater;

a self-contained, compressor-containing, closed secondary system for the transfer of heat, separate from the primary system, said primary system being coupled to said secondary system through a first heat exchanger for evaporation of the seawater and a second heat exchanger for condensation of the seawater vapour; a cyclone separator arranged in the vapour chamber between the evaporator and the condenser; a distributor for subdividing the total seawater flow supplied to the primary system into a first component flow and a second component flow of approximately equal magnitude; a first heat transfer unit through which flows the hot water distillate at the output of the primary system in which unit the first component flow is brought to a temperature approaching the boiling temperature in the primary system; and a second heat transfer unit through which flows the discharged hot wash-out, in which unit the second component flow is brought to a temperature approaching the boiling temperature in the primary system, and two upstream throttle members for controlling a concentration factor (CF) being the ratio of a supplied total seawater quantity per unit of time to wash-out quantity per unit of time with a value between 1.3 and 1.4.

10. An apparatus as claimed in claim 9, wherein the concentration factor (CF) amounts to about 1.33.

11. An apparatus as claimed in claim 9, wherein the magnitude of the first component flow in a first feeding pipe is approximately equal to the magnitude of the distillate flow in a distillate pipe, and the magnitude of the second component flow in a second feeding pipe is approximately equal to the magnitude of the wash-out flow in a discharge pipeline.

12. An apparatus as claimed in claim 9, wherein a heating apparatus is provided in a distilling flask to which the first and second component flow are supplied.

13. An apparatus as claimed in claim 9, wherein there is provided a third heat transfer unit through one side of which flows the second component flow in the second feeding pipe and the other side of which is part of an external heating installation.

14. An apparatus as claimed in claim 13, wherein the oil-fired or gas-fired heating installation is provided with a forced-circulation heat transfer medium which flows through the third heat transfer unit.

15. An apparatus as claimed in claim 9, wherein the heat transfer units are manufactured from titanium in plate-type exchanger technology.

16. An apparatus as claimed in claim 9, wherein the evaporator in the primary system comprises a circulatory evaporator with one of natural or automatic or forced liquid circulation.

17. An apparatus as claimed in claim 9, wherein the pipeline supplying the total seawater quantity is connected to a metering station for the addition of an additive.

18. An apparatus as claimed in claim 9, wherein the distillate pipe is connected to a conditioning station.

19. An apparatus as claimed in claim 9, wherein the second heat transfer unit is provided with an off-shutting bypass.

* * * * *